United States Patent Office 3,808,278
Patented Apr. 30, 1974

3,808,278
2-HYDROXYBENZOPHENONES
Lajos Avar, Binningen, Basel-Land, and Kurt Hofer, Munchenstein, Basel-Land, Switzerland, assignors to Sandoz Ltd. (also known as Sandoz AG), Lichtslr, Switzerland
No Drawing. Filed Mar. 13, 1972, Ser. No. 234,335
Claims priority, application Switzerland, Mar. 17, 1971, 3,857/71
Int. Cl. C07c 49/82
U.S. Cl. 260—591                  16 Claims

ABSTRACT OF THE DISCLOSURE

The invention provides novel compounds of Formula I,

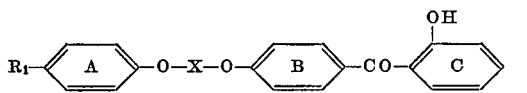

in which X signifies a radical of Formula II, III or IV,

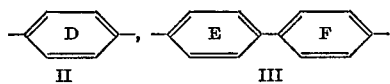

or

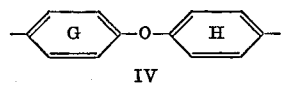

in which rings D to H may be further substituted by one or more alkyl groups of 1 to 12 carbon atoms,
$R_1$ signifies a hydrogen atom, an alkyl group of 1 to 12 carbon atoms or a radical of Formula V,

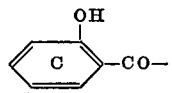

and the rings A, B and C may be further substituted by one or more alkyl groups of 1 to 12 carbon atoms, with the proviso that the total number of carbon atoms in all alkyl substituents on the benzene rings of the compounds of Formula I does not exceed 12,
and a process for their production. The compounds are useful as stabilizers against ultraviolet radiation.

---

This invention relates to novel 2-hydroxybenzophenone derivatives which are useful for stabilizing organic materials in particular against the destructive action of ultraviolet radiation.

More particularly, this invention provides compounds of Formula I,

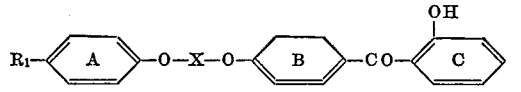

in which X signifies a radical of Formula II, III or IV,

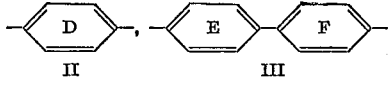

or

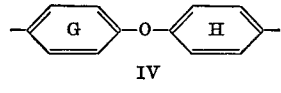

in which rings D to H may be further substituted by one or more alkyl groups of 1 to 12 carbon atoms, $R_1$ signifies a hydrogen atom, an alkyl group of 1 to 12 carbon atoms or a radical of Formula V,

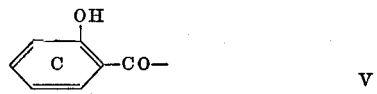

and the rings A, B and C may be further substituted by one or more alkyl groups of 1 to 12 carbon atoms, with the proviso that the total number of carbon atoms in all alkyl substituents on the benzene rings of the compounds of Formula I does not exceed 12.

The invention also provides a process for the production of compounds of Formula I, characterized by condensing an appropriate compound of Formula VI,

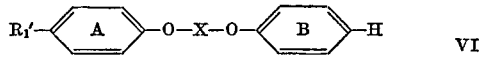

in which X and rings A and B are as defined above, and $R_1'$ signifies a hydrogen atom or an alkyl group of 1 to 12 carbon atoms provided that where a compound of Formula I in which $R_1$ signifies a radical of Formula V is desired, then $R_1'$ signifies a hydrogen atom, with a reactive derivative of a compound of Formula VII,

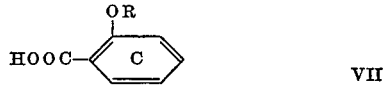

in which R signifies an alkyl group of 1 to 4 carbon atoms, ring C is as defined above, under Friedel-Crafts reaction conditions,
and converting any —OR group in any resulting product of Formula VIII,

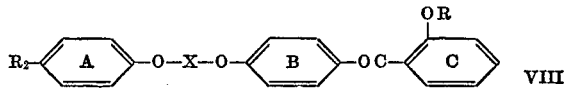

in which
R, X and rings A, B and C are as defined above, and
$R_2$ signifies a hydrogen atom, an alkyl group of 1 to 12 carbon atoms or a radical of Formula IX,

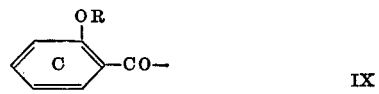

in which R and ring C are as defined above.

into an OH group.

The condensation of the compounds of Formulas VI and VII may be carried out under conventional Friedel-Crafts conditions (see, for example Olah, "Friedel-Crafts and Related Reactions," 1966 and Merck Index, Suppl. vol. 7, 1928 (1960)). Mild conditions should, however, be employed to avoid any undesired conversion of the —OR group in Compounds VII to an OH group. Preferably, the condensation is effected at a temperature below 50° C., more preferably at a temperature of from —10° to +25° C. Conventional Friedel-Crafts catalysts, such as tin tetrachloride, iron (III) chloride, aluminum bromide, aluminum chloride or adducts of aluminum chloride with alkali metal chlorides, such as sodium, potassium or lithium chloride, may be used preferably aluminimum chloride is employed and the reaction is carried out in an inert organic solvent preferably a solvent whose boiling point is at least 100° C., such as carbon disulphide, di-, tri- or tetrachloromethane, di- or tetrachloroethane, chlorobenzene, bromobenzene, o-dichlorobenzene or nitrobenzene.

Naturally, where in the compound of Formula I it is desired that $R_1$ signifies a radical of Formula V, at least two moles of the compound of Formula VII should be used for each mole of the compound of Formula VI.

Otherwise, equimolar proportions may suitably be employed.

It will be appreciated that some of the desired compound of Formula I may be produced initially, the conversion of the —OR group to an —OH occurring under the conditions of condensation. The subsequent conversion, however, of any —OR group in any resulting product of Formula VIII to a hydroxy group may be carried out by acid hydrolysis, for example by treatment with hydrobromic acid in an anhydrous, low molecular-weight alkane carboxylic acid, e.g. anhydrous propionic acid or glacial acetic acid, and suitably at a temperature of from room temperature to the reflux temperature of the reaction mixture, preferably at a temperature of from 60° to 100° C. Alternatively, and preferably, the conversion is effected by heating the reaction mixture obtained from the first step, for example to 50° to 120° C.

The resulting compounds of Formula I, may be isolated and purified in conventional manner, the metal complex by-product formed being first decomposed in an aqueous acid phase. The compound of Formula I may be separated and purified by conventional techniques, e.g. by recrystallization from alcohol, ethyl acetate, methyl ethyl ketone, toluene or benzene or by washing in a suitable organic solvent.

The compounds of Formulas VI and VII are either known or may be produced in conventional manner. Suitable compounds of Formula VI include 4-phenoxy-diphenyloxide, 4,4'-(bis-phenoxy)-diphenyl oxide and 4,4'-(bis-phenoxy)-diphenyl. Suitable reactive derivative of compounds of Formula VII include conventional acid derivatives used in Friedel-Crafts reactions, e.g. anhydrides and halides, preferably chlorides.

As indicated, the benzene rings in the compounds of Formula I may be substituted by one or more alkyl groups of 1 to 12 carbon atoms, provided that the total number of carbon atoms in all alkyl substituents does not exceed 12. In general, such alkyl substitution improves the solubility and, often, the stabilizing properties of the compound. The alkyl substituents may be straight or branched chain and suitable alkyl groups include the methyl, ethyl, t-butyl, hexyl, nonyl, dodecyl, 1,1,3,3-tetramethylbutyl and isopropyl radicals.

As indicated, the compounds of Formula I are useful as stabilizers for organic compounds and are particularly useful as ultraviolet absorbers. For this purpose they may be incorporated into light-sensitive substances, or may be coated on such to form a protective film. The products of the invention reduce degradation of the light-sensitive substances by absorption of ultraviolet rays. The products of the invention are particularly useful as stabilizers in the plastics field, for example for cellulose acetate, cellulose acetobutyrate, polyethylene, polypropylene, polyvinyl chloride, polyvinyl chloride acetate, polyamides, polystyrene, ethyl cellulose, cellulose nitrate, polyvinyl alcohol, silicon rubber, cellulose propionate, melamine-formaldehyde and urea-formaldehyde resins, allyl casting resins, polymethyl methacrylate, polyesters and polyacrylonitrile. They may also be used for stabilizing natural products such as wool, rubber, cellulose and silk.

The materials to be protected may be in the form of films or sheets, panelling, rods, coatings, tapes, fibres, granules, powders or other solid forms, or solutions, emulsions or dispersions. The compounds of the invention may be incorporated in or coated on the materials by known methods. One important method of application consists in intimately mixing the selected compound with the material, for example polypropylene granules, in a kneader or other suitable machine, and extruding the mixture. This method gives very homogeneous blending which is important for good protection. The material may be extruded, for example, as film, tubing or filament, the latter for weaving into textile fabrics. In this method the ultraviolet absorber is incorporated in the polypropylene before it is converted into textiles. An alternative method is to treat the yarn or fabric with the new compounds, for example by application from a superfine aqueous dispersion. This method is especially suitable for textiles of polyethylene terephthalate and cellulose acetate fibres.

Synthetic polymeric materials need not necessarily be in final form when the compounds of Formula I are added. Thus, if desired, they can be incorporated in the monomers or prepolymers prior to the reaction giving the final polymer.

The new ultraviolet absorbers can be used not only for stabilizing clear films, moulded plastic products and the like, but also opaque, semi-opaque and translucent materials with a surface subject to degradation by ultraviolet radiation. Examples of such materials are foam plastics, opaque films and coatings, opaque papers, opaque and transparent colored plastics, fluorescent pigments, automobile and furniture polishes, creams, lotions and similar products, either opaque, clear or translucent.

The compounds of Formula I may be applied in combination with other ultraviolet absorbers or stabilizers. Such mixtures of active substances often have synergistic action and may protect the materials simultaneously against ultraviolet radiation, heat and oxidative degradation.

In addition to the indicated uses as protective additives and protective films, the compounds may be used to provide indirect protection against ultraviolet radiation; for example, fruit, cooking fat and butter may be protected by packaging in plastic films containing a compound of Formula I.

As indicated, the new compounds may be incorporated in the materials to be protected at any stage of procesing using known methods. The amounts employed may vary within wide limits, e.g. from 0.01 to 5%, preferably from 0.05% to 1%, based on the weight of the material.

In the following examples, M.P. stands for melting point, B.P. for boiling point and λ for wavelength. The parts and percentages are by weight and the temperatures in degrees centigrade.

EXAMPLES OF THE PRODUCTION OF COMPOUNDS OF FORMULA I

Example 1

26.4 parts of 4-phenoxy-diphenyloxide and 36.8 parts of 2-methoxy-3-methyl benzoic chloride are stirred into 280 parts of tetrachloroethane. Over 2 hours, 29.4 parts of aluminum chloride are added, in portions, at —5° to 0°. After the theoretical amount of hydrogen chloride has been split off, the temperature of the mixture is increased over 5 hours to 115–120°. Subsequently, dilute hydrochloric acid is added to the thick slurry and the solvent distilled with water vapor. The solid residue is washed with water until neutral and dried, to obtain the compound of Formula X,

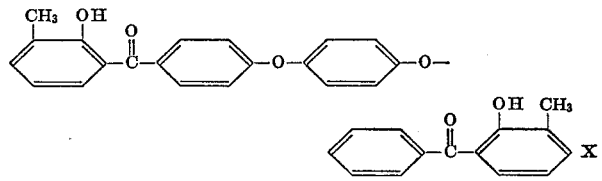

On recrystallization from dioxan, 42 parts of colorless, analytically pure crystals are obtained, M.P. 176–177° and λ max. at 291 and 344 nm. (in ethanol).

Example 2

31.8 parts of 4-(4'-tert.butyl-phenoxy)-diphenyl oxide and 17.05 parts of 2-methoxy benzoic chloride are stirred into 240 parts of tetrachloroethane. Over 35 minutes, 14.7 parts of aluminum chloride are added in portions at —8°. After cleavage of the theoretical amount of hydrogen chloride, the mixture is raised during the course of 4 hours to 100°, and a mixture of hydrogen chloride and water is run into the thick mass and the solvent distilled with water vapor. A yellow oil separates out of the water, It is collected in toluene, washed with water until neutral. The toluene is distilled off under vacuum and the residue recrystallized from methanol. The crystals melt at 76–77° and the values for the content of C, H and O obtained in elementary analysis correspond to the following Formula XI,

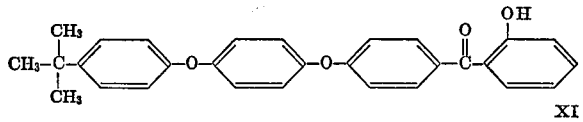

The absorption maxima λ may of the compound measured in ethanol are at 285 and 335 nm.

The compounds specified in Table 1 below are obtained by a procedure analogous to that of Example 1 or 2.

Example B

Polypropylene and 0.2% of the compound of Formula XI described in Example 2 are mixed, extrusion moulded and tested as described in Example A. After 200 hours in the "Klimatest" the film shows no change; a comparative film without a compound of Formula I is brittle and shows hair cracks after this period of exposure.

What is claim is:

1. A compound of formula

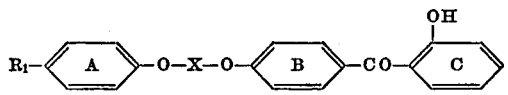

TABLE 1

| Example number | Formula | Formula number | M.P., degrees | $\lambda_{max.}$ in ethanol, nm |
|---|---|---|---|---|
| 3 | (structure) | XII | Oil | 285, 335 |
| 4 | (structure) | XIII | Oil | 286, 335 |
| 5 | (structure) | XIV | Oil | 286, 333 |
| 6 | (structure) | XV | 167–168 | 292, 332 |
| 7 | (structure) | XVI | 124–126 | 290, 330 |
| 8 | (structure) | XVII | 143–144 | 291, 346 |
| 9 | (structure) | XVIII | 155–56 | 295, 335 |
| 10 | (structure) | XIX | 196–98 | 292, 320, 335 |
| 11 | (structure) | XX | 142–44 | 290, 335 |

EXAMPLES OF THE APPLICATION OF COMPOUNDS OF FORMULA (I)

Example A

Polyvinyl chloride with a 0.5% addition of one of the compounds specified in Examples 1 or 6 to 11 is worked on a roll mill at 180° until homogeneously mixed. The mixture is extrusion moulded as a 0.3 mm. thick film. The weathering resistance of the film is tested by the De La Rue method in the "Klimatest" at 40° and 75% relative humidity, with irradiation by 16 Philips sun lamps and 16 black lamps. After 800 hours the film shows no change, whereas a film containing no compound of Formula I turns brown after exposure for 200 hours.

in which X signifies a radical of formula

-⟨D⟩-, -⟨E⟩-⟨F⟩- or

-⟨G⟩-O-⟨H⟩- in which rings D to H may be further substituted by one or more alkyl groups of 1 to 12 carbon atoms, $R_1$ signifies a hydrogen atom, an alkyl group of 1 to 12 carbon atoms or a radical of formula

OH
⟨C⟩-COand the rings A, B and C may be further substituted by one or more alkyl groups of 1 to 12 carbon atoms, with the proviso that the total number of carbon atoms in all alkyl substituents on the benzene rings of the compounds of Formula I does not exceed 12.

2. A compound of claim 1 which is of formula

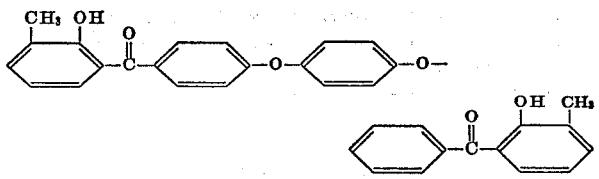

3. A compound of claim 1 which is of formula

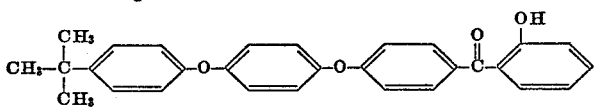

4. A compound of claim 1 which is of formula

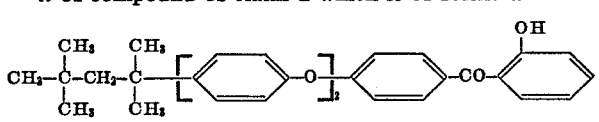

5. A compound of claim 1 which is of formula

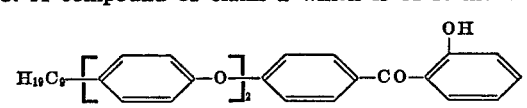

6. A compound of claim 1 which is of formula

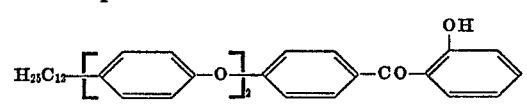

7. A compound of claim 1 which is of formula

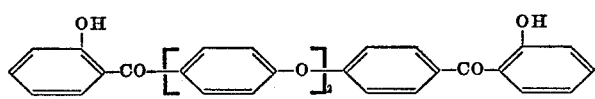

8. A compound of claim 1 which is of formula

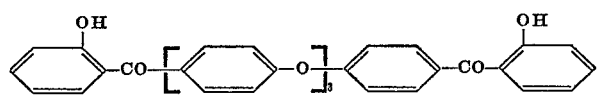

9. A compound of claim 1 which is of formula

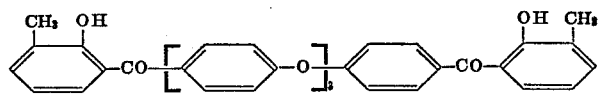

10. A compound of claim 1 which is of formula

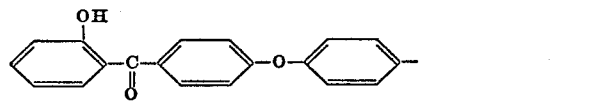

11. A compound of claim 1 which is of formula

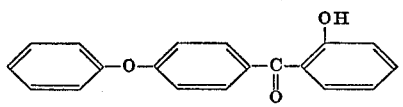

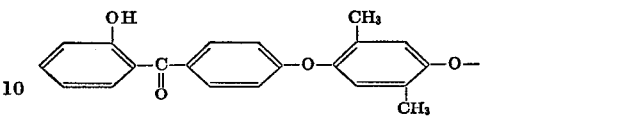

12. A compound of claim 1 which is of formula

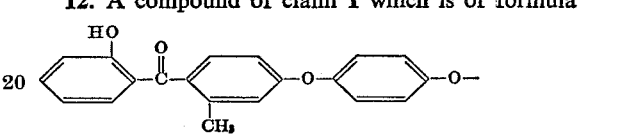

13. A compound of claim 1 in which $R_1$ is alkyl or a radical of formula

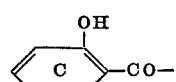

14. A compound of claim 13 in which X is a radical of formula

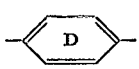

15. A compound of claim 13 in which X is a radical of formula

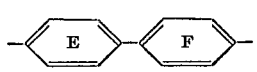

16. A compound of claim 13 in which X is a radical of formula

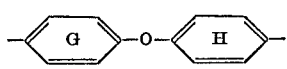

References Cited

UNITED STATES PATENTS 3,146,269   8/1964   Braus et al. _____ 260—591

FOREIGN PATENTS 1,052,389   2/1965   Great Britain _____ 260—59

DANIEL D. HORWITZ, Primary Examiner

U.S. Cl. X.R.

21—58; 260—45.95